US012644515B2

(12) United States Patent (10) Patent No.: US 12,644,515 B2
Bunout                                                    (45) Date of Patent: Jun. 2, 2026

(54) ACTUATOR FOR A PARKING LOCK

(71) Applicant: Schaeffler Technologies AG & Co. KG, Herzogenaurach (DE)

(72) Inventor: Felix Bunout, Karlsruhe (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 272 days.

(21) Appl. No.: 18/567,391

(22) PCT Filed: Apr. 19, 2022

(86) PCT No.: PCT/DE2022/100293
§ 371 (c)(1),
(2) Date: Dec. 6, 2023

(87) PCT Pub. No.: WO2022/258095
PCT Pub. Date: Dec. 15, 2022

(65) Prior Publication Data
US 2024/0271698 A1     Aug. 15, 2024

(30) Foreign Application Priority Data

Jun. 7, 2021     (DE) ..................... 10 2021 114 492.2

(51) Int. Cl.
*F16H 63/34*          (2006.01)
*B60K 1/00*           (2006.01)
(52) U.S. Cl.
CPC ..... *F16H 63/3433* (2013.01); *F16H 63/3475* (2013.01); *B60K 2001/001* (2013.01)
(58) Field of Classification Search
CPC ............. F16H 63/3433; F16H 63/3475; B60K 2001/001
See application file for complete search history.

(56) References Cited

U.S. PATENT DOCUMENTS 9,777,836 B1 * 10/2017 Lee ........................... F16H 3/66
2004/0011609 A1 * 1/2004 Schmid ............... F16H 63/3433
188/158

(Continued)

FOREIGN PATENT DOCUMENTS

CN          104088853 A          10/2014
CN          104412012 A          3/2015

(Continued)

OTHER PUBLICATIONS

Source: First Office Action Corresponding to Chinese Patent Application No. 202280031949.0, dated Dec. 26, 2025, 10 Pages.

*Primary Examiner* — Edwin A Young

(57) ABSTRACT

The disclosure relates to an actuator for a parking lock having: an actuation element configured to be axially moved from a normal position to a deflected position; a first energy storage element for transmitting a stored force, the actuation element forced in a direction of the normal position by the stored force; a stopper element; a stopper component; and a holding element configured to be moved between a released position and a locking position. The stopper element and the stopper component are fixed to each other when the actuation element is in the deflected position while the holding element is in the locking position, and the actuation element is held in the deflected position against the stored force of the first energy storage element via the stopper element fixed in the locking position by the holding element. A second energy storage element passively holds the holding element in the locking position.

20 Claims, 4 Drawing Sheets

1

(56)                References Cited

U.S. PATENT DOCUMENTS

| | | | |
|---|---|---|---|
| 2008/0277237 A1 | 11/2008 | Ruhringer | |
| 2019/0257422 A1* | 8/2019 | Schlosser | F16H 63/3433 |
| 2019/0271395 A1* | 9/2019 | Schwegler | F16H 63/3433 |
| 2020/0072350 A1* | 3/2020 | Luipold | F16H 63/3475 |

FOREIGN PATENT DOCUMENTS

| | | |
|---|---|---|
| CN | 105840811 A | 8/2016 |
| CN | 107850212 A | 3/2018 |
| CN | 117222829 A | 12/2023 |
| DE | 2164578 A1 | 7/1973 |
| DE | 10347667 A1 | 4/2004 |
| DE | 102013213678 A1 | 1/2015 |
| DE | 102018115548 A1 | 1/2019 |
| EP | 2458226 A1 | 5/2012 |
| WO | 2005124198 A1 | 12/2005 |

* cited by examiner

ACTUATOR FOR A PARKING LOCK

CROSS-REFERENCE TO RELATED APPLICATIONS

This application is the U.S. National Phase of PCT Application No. PCT/DE2022/100293 filed on Apr. 19, 2022, which claims priority to DE 10 2021 114 492.2 filed on Jun. 7, 2021, the entire disclosures of which are incorporated by reference herein.

TECHNICAL FIELD

The disclosure relates to an actuator for a parking lock. The disclosure further relates to a parking lock for a parking lock device of a transmission, a parking lock device having such a parking lock, a transmission having such a parking lock device for a drive train, and a drive train having such a transmission.

BACKGROUND

Such parking locks are known, for example, from DE 10 2018 115 548 A1. Motor vehicles having a parking lock in a normally locked configuration, for example, with what is termed a by-wire parking lock, i.e., with a blocked chassis in the event of a system failure, must be actively kept open while driving with constant energy consumption. In the course of the electrification of motor vehicles, the energy requirement of all components is significant for the achievable range and therefore energy-efficient operation of the parking lock when the motor vehicle is in motion must be sought.

An actuating device for a parking lock unit is known from DE 10 2013 213 678 A1, in which a low holding current for an electromagnet is required to lock the parking lock unit in the open operating state. In addition, an unintentional opening of the parking lock unit can be prevented by a non-switching state of the electromagnet.

Proceeding therefrom, the object of the present disclosure is to at least partially overcome the disadvantages known from the prior art. The features described herein can be combined in any technically sensible manner and way, wherein the explanations in the following description and features from the figures, which comprise additional embodiments of the disclosure, can also be used for this purpose.

SUMMARY

The disclosure relates to an actuator for a parking lock having at least the following components: an axial drive means for transmitting an axial force, an actuation element having an actuation axis which is axially movable from a normal position to a deflected position by means of the axial force of the axial drive means, and a first energy storage element for transmitting a stored force antagonistic to the axial force. The free actuation element is forced in the direction of the normal position by the stored force.

The actuator also has at least the following components: a stopper element, a stopper component corresponding to the stopper element, and a holding element which can be moved between a released position and a locking position, wherein the stopper element and the stopper component are fixed to one another while the actuation element is in the deflected position with the holding element in the locking position. The actuation element is held in the deflected position against the stored force of the first energy storage element by means of the stopper element being fixed in the locking position through the holding element.

In the following, reference is made to the stated actuation axis when the axial direction, radial direction, or the circumferential direction and corresponding terms are used, unless explicitly stated otherwise. Unless explicitly stated otherwise, ordinal numbers used in the preceding and subsequent description are used only for the purposes of clear distinction and do not indicate an order or a ranking of designated components. An ordinal number greater than one does not necessarily mean that another such a component must be present.

The actuator proposed here comprises an axial drive means, for example an electric actuator having a spindle drive or a slave piston of a fluidic, i.e., pneumatic or hydraulic, actuating system. An axial force can be exerted along an actuation axis by means of the axial drive means and can be transmitted to the actuation element. The actuation element is, for example, a ram or rod, an axially movable spindle or an axially movable spindle nut. The actuation element is set up to transmit the axial force of the axial drive means to a locking mechanism. The actuation element is movably guided along an actuation axis, which can be moved axially from a (normal) first position into a (deflected) second position by means of the axial drive means. In an example embodiment, the actuation element can be returned to the normal position exclusively passively by the stored force of the first energy storage element, which is antagonistic to the axial force of the axial drive means. Alternatively, the actuation element can additionally be returned from the deflected position to the normal position by the axial drive means. The axial force of the axial drive means that can be transmitted by means of the actuation element is set up to overcome an antagonistic force of the first energy storage element and a locking mechanism, and a (normally locked) locking mechanism can be transferable from the locking state to the free state. Alternatively, a (normally open) locking mechanism can, conversely, be converted from the free state to the locking state. The (first) energy storage element is designed, for example, as a helical compression spring, disc spring, magnetic spring, or gas pressure spring. The first energy storage element is can be designed as a helical compression spring with a spring axis that is parallel to or coaxial with the actuation axis.

To enable maintaining the respective state of the locking mechanism with little energy, a stopper element is proposed here which is set up to interact with a corresponding stopper component in such a way that a frictional and/or positive connection is formed. In an example embodiment, the stopper element is fixed to the axial drive means or to the actuation element, and the stopper component is fixed axially to a counter bearing of the axial drive means at least during the deflected position of the actuation element. Alternatively, this is done the other way around. In an example embodiment, the stopper element is formed by at least one tab with a contact point, wherein the contact point can be brought into contact with the corresponding stopper component to apply the holding force. In an example embodiment, a (preferably switchable) magnetic (stopper) force is additionally generated, with which the stopping force resulting from the form fit and/or friction fit is supported. In an example embodiment, the stopping force is a force that supplements the axial force, and the (required) axial force to overcome the above-mentioned antagonistic stored force can be reduced by means of or while the stopping force is maintained, and consequently the energy consumption of the actuator is reduced. In another embodiment, the stopping force (without the cooperation of the holding element) is negligibly small, wherein preferably no magnetic force is provided between the stopper element and the corresponding stopper component.

In an example embodiment, the corresponding stopper component (or stopper element) (fixed in the deflected position) is axially fixed and thus fixed relative to the counter bearing of the axial drive means (for example the fluidic cylinder of a slave piston). In an alternative embodiment, the corresponding stopper component can be moved with the axial drive means or with the actuation element and is fixed in the second position by means of a stop.

To ensure that the parking lock maintains the normal state (whether it is normally locked or normally open), the stopping force is less than the stored force of the first energy storage element that is antagonistic to the axial force of the axial drive means (possibly in total with the antagonistic force of the locking mechanism), wherein the antagonistic (cumulative) force for transferring the actuation element from the deflected position to the normal position can be transmitted. In a normally locked configuration of the parking lock, the axial force actively transfers the parking lock from the (normal) locking state to the (deviating) free state, wherein the normal position of the actuation element is in the locking state (parking position) and the deflected position corresponds to the free state (driving position). In the normal position, no axial force needs to be or is applied, so no external energy input is required from the axial drive means. The normal position of the actuation element is secured by means of the stored force of the first energy storage element. An axial force is required to transfer the actuation element into the deflected position, wherein external energy consumption is necessary for this purpose.

For the stopper force to be sufficient to hold the actuation element in the deflected position (for example the driving position with a parking lock in a normally locked configuration), it is proposed here that a holding element is also provided. The holding element is movable between a locked position and a released position. In the locking position, the holding element fixes the position of the corresponding stopper component and the stopper element in the state that corresponds to the deflected position of the actuation element. A force is then transmitted by the holding element such that the resulting stopping force is sufficient to overcome the force antagonistic to the axial force of the axial drive means. In the case of a purely frictional connection between the stopper element and the corresponding stopper component, an additional holding force can be applied by the holding element to increase the frictional adhesion, such as by means of a connecting link, for example a ramp shape on the holding element and/or on the stopper element. At least the holding element forms a form fit with the stopper element in such a way that the stopper element is prevented from deviating. The possibility of an evasive movement (without the action of the holding element) is intentional, so that the connection between the stopper element and the corresponding stopper component (under the influence of the antagonistic stored force or total force) releases automatically as soon as the holding element is in the released position and the axial force of the axial drive means is sufficiently low, preferably minimal (e.g., zero or negative).

In an example embodiment, the (corresponding) stopper component is formed by means of an undercut (relative to the actuation axis), for example by means of a groove. In an example embodiment, the contact point of the stopper element is an elevation, preferably on a tip of the stopper element designed as a tab, which can be lowered axially behind the undercut, for example a groove, to form a form fit. In an example embodiment, the stopper element is formed by at least one spring lug with an axial main extent and a radial spring direction. In an example embodiment, to avoid tilting forces transverse to the actuation axis, an arrangement symmetrical to the actuation axis is formed of partial elements of the stopper element and the stopper component, and preferably of the holding element formed as a ring-like arrangement. For example, the stopper element comprises a plurality of (preferably spring) tabs and the corresponding stopper component has a complementary receptacle, for example a circumferential counter surface or undercut (for example a groove). The holding element is then can be likewise formed in a manner complementary to the plurality of tabs or in the shape of a ring. The holding element can be arranged radially outside both the stopper element and the stopper component. In this case, it can be provided in particular that the stopper component is arranged radially inside the stopper element.

It is also provided in the embodiment of the actuator according to the disclosure that a second energy storage element is also provided, by means of which the holding element can be held passively in the locked position.

In an example embodiment, the second energy storage element proposed here is supported directly or indirectly on the counter bearing of the axial drive means of the actuator, so that a pre-holding force is exerted on the holding element. The holding element is thus passively pretensioned in the locking position and can only be actively transferred into the released position. For a parking lock in a normally locked configuration, the actuator is designed in such a way that when external (e.g., electrical) energy is supplied, the holding element changes from the locked position thereof to the released position thereof, and the axial movement is transferred from a (passively secured) free state to the (normal, i.e., passive) locking state. The reverse is true for a parking lock in a normally open configuration.

In particular, a slave cylinder can be provided here as a counter bearing. The second energy storage element can be provided axially along the actuation axis between the housing of the slave cylinder and a slave piston for the axial displacement of the actuation element. In particular, the second energy storage element can be arranged to be coaxial to the actuation axis between the slave cylinder housing and the holding element. The slave cylinder housing can be the housing section that faces the parking lock or the parking lock pawl. In particular, the second energy storage element can be arranged in a ring around the actuation axis. The holding element is held in the locking position by means of the second energy storage element in such a way that no energy consumption is required to hold this position. The open operating state of the parking lock can then be maintained without further energy consumption.

When the stopper element and the stopper component are in a state corresponding to the deflected position of the actuation element, the actuation element is then held in the second position without external energy consumption (that is to say passively). As soon as the holding element (actively and against the pre-holding force of the second energy storage element) is transferred into the released position, the stopper element and the stopper component are released from one another unless a sufficient (active) axial force is applied by the axial drive means. In the case of a latching (groove and tab), the fixing of the stopper element from the stopper component is reversed and the stopper element slides out of the stopper component due to the stored force (of a first energy storage element) that is antagonistic to the axial force.

The second energy storage element is designed, for example, as a helical compression spring, disk spring, magnetic spring, or gas pressure spring. The second energy storage element can be designed as a helical compression spring with a spring axis that is parallel or coaxial with the actuation axis. For example, the diameter of the second energy storage element is limited by the diameter of the actuator and/or by the wall thickness of the holding element, so that the energy storage element can act on the holding element in a radially circumferential manner. In another embodiment, the second energy storage element comprises a plurality of separate springs (such as helical compression springs), which are arranged circumferentially and act on the holding element at specific points.

It is also proposed in an example embodiment of the actuator that the stopper element is firmly connected to the actuation element. The stopper element can comprise at least one spring element. In an example embodiment, the spring element is deflectable exclusively in the radial direction.

Here it is now proposed that the stopper element is rigidly connected to the actuation element. In the fluidic embodiment of the actuator, the stopper element is can be firmly connected to the slave piston, so that the stopper element is also moved axially when the actuation element is transferred from the normal position to the deflected position by means of the axial drive means. In the embodiment of the actuator having an electric drive machine, the stopper element is then fixed axially with a shoulder or with the axially movable spindle or the axially movable spindle nut.

In an example embodiment, to avoid tilting forces transverse to the actuation axis, an arrangement symmetrical to the actuation axis is formed of partial elements of the stopper element and the stopper component, and preferably of the holding element formed as a ring-like arrangement. For example, the stopper element comprises a plurality of (preferably spring) tabs and the corresponding stopper component has a complementary receptacle, for example a circumferential counter surface or undercut (for example a groove). The holding element can then be likewise formed in a manner complementary to the plurality of tabs or in the shape of a ring.

In an example embodiment, the stopper element comprises at least one spring element, for example a (sufficiently elastic) projection with radial extension between the attachment point and the contact point to the corresponding stopper component.

The at least one spring element is made, for example, from a metallic material, for example a spring steel sheet. In another embodiment, the spring element is made of a plastic. In an example embodiment, the at least one spring element is integrally comprised by the stopper element.

In an example embodiment, the spring element can only be deflected in the radial direction. This means that during operation of the actuator and thus an axial movement of the stopper element, only a small (radial) force needs to be provided to hold the actuation element in the deflected position.

It is further proposed in an example embodiment of the actuator that a snap closure is formed by the stopper component together with the stopper element.

For example, the snap closure is designed in the form of a hook or undercut or a latching groove and a spring element in the form of a spring lug. The corresponding stopper component thus comprises an undercut or a latching groove or a (sprung or unsprung) hook. The stopper element comprises a complementary (sprung or unsprung) hook or an undercut or a latching groove. In an example embodiment, the stopper component is designed in the manner of a sleeve, for example, and is positioned to be coaxial with the actuation axis. A radially protruding elevation or a circumferential flange (for example, with a ramp at least on one side) can be provided (seen in the relative direction of movement from the normal position to the deflected position) in front of the undercut or in front of the latching groove. Alternatively or additionally, a ramp is provided on the (sprung or unsprung) hook in the direction of the relative direction of movement at the front and can also have a ramp at the rear. With the ramps, the necessary forces are low. A ramp, for example, increases linearly or is designed as a rounding.

It is also proposed in an example embodiment of the actuator that a lifting magnet with a coil and a reciprocating piston that can be moved axially by means of a magnetic force that can be generated by the coil is also provided, wherein the holding element is firmly connected to the axially moving reciprocating piston; and/or the actuation element can be fixed in the deflected position independently of the axial drive means.

In an example embodiment, it is proposed that a lifting magnet having a coil and a reciprocating piston that can be moved axially by means of a magnetic force generated by the coil is provided, wherein the holding element is firmly connected to the axially moving reciprocating piston. Thus, by energizing the coil, such a magnetic field can be induced with a magnetic force (can be switched off) resulting on the holding element, so that when the magnetic force is applied, the holding element is transferred from the locked position to the released position. The magnetic force can be at least partially opposed to a pre-holding force of the second energy storage element. This creates an electronic switchability of fixing the actuation element in the deflected position. In an example embodiment, the holding element and the reciprocating piston are formed in one piece with one another.

In addition, it can be provided that the lifting magnet, the second energy storage element, and the holding element are all ring-shaped, and are arranged to be coaxial to the actuation axis and to be axial between the axial drive means or slave piston and the housing wall of the housing of the axial drive means or slave cylinder facing the parking lock or parking lock pawl.

Alternatively or additionally, it is proposed in an example embodiment that the actuation element can be fixed in the deflected position (such as the driving position) independently of the axial drive means. For this purpose, the actuation element and the axial drive means are designed in multiple parts, possibly in two parts. This allows the actuation element, for example when the motor vehicle is in a passive state, (preferably by an unlocking element) to be moved into the deflected position without needing to carry the axial drive means therewith, or the axial drive means can assume the position corresponding to the normal position again while the actuation element remains in the deflected position.

In an example embodiment, the actuation element is set up in such a way that it remains self-locking in the deflected position, for example by means of the stopper element, the stopper component, and the holding element. Alternatively, a further means for holding the (separate) actuation element is provided. In the latter case, the axial drive means itself can be held in the deflected position by means of the stopper element, the stopper component and the holding element, and the actuation element is then fixed in the deflected position only indirectly via the axial drive means. The actuation element can then be fixed not only separately from the axial drive means, but also separately in the deflected position.

According to a further aspect, a parking lock is proposed for a parking lock device of a transmission, having at least the following components:

a locking mechanism for locking a locking gear in a torque flow, such that the locking gear is blocked in use by the locking mechanism in a locking state, and the locking gear is released in a free state; and an actuator according to an embodiment as described above, wherein in the deflected position of the actuation element the locking mechanism is brought out of the locking state and the normal position of the actuation element corresponds to the locking state of the locking mechanism.

The parking lock proposed here is set up in such a way that the locking mechanism blocks the locking gear in a locking state and the locking gear is released from the locking mechanism only in a free state. In the free state, the locking gear is freely rotatable, for example used in a transmission of a motor vehicle; the motor vehicle can then be rolled. It should be noted that the locking gear is integrated in a torque flow of a transmission. If the actuation element is introduced into the locking state, the torque flow is locked by means of the locking mechanism and the transmission is blocked. When the locking gear is in the locking state, the motor vehicle cannot be rolled in such an application in a transmission.

The parking lock comprises an actuator having an actuation element, which is connected to the locking mechanism. The actuation element is connected to the locking mechanism in such a way that when the actuation element is in the deflected position, the state that deviates from the normal state is present in the locking mechanism. In the case of a parking lock in a normally locked configuration, the free state can therefore be actively brought about by means of the actuator. However, the state deviating from the normal state does need not be held actively (i.e., under external energy consumption), but is held passively by the stopper element and the stopper component with the support of the holding element. For example, by energizing the (purely optional) coil of the lifting magnet described above, the stopper element is separated from the stopper component and the actuation element is thus (preferably passively) transferred from the deflected position to the normal position. The locking mechanism is thus free to return to the normal state from the deviated state.

It is also proposed in an example embodiment of the parking lock that an unlocking element is also provided, which can be moved between a normal position and an unlocking position, wherein it is ensured that the unlocking position is maintained in the free state of the locking mechanism and the normal position is in the normally locked function of the parking lock.

The parking lock is actuated, for example, electrically and/or fluidically, for example pneumatically or hydraulically, and if the electronics fail or a fluidic pressure or fluidic volume drops, the locking mechanism is switched to the normal (preferably locking) state. With a parking lock in the normally locked configuration, the locking gear is then blocked. To switch this off during a passive state (e.g., in a motor vehicle during production, transport or in a workshop), it is proposed here that an unlocking element be provided which can be moved between two positions (e.g., designed as a pivoting lever mounted around a pivoting axis). The unlocking element is set up in such a way that the deviating (for example free) state of the locking mechanism can be maintained with the unlocking element in the unlocking position without external energy consumption. In this passive state, it is thus ensured that when the (normally locked) parking lock is used in a transmission of a motor vehicle, the motor vehicle can still roll. To eliminate this passive state, which is precisely undesirable when the parking lock is in operation, the unlocking element can be deactivated again (preferably repeatedly), i.e., it can be converted into the normal position.

In an example embodiment, a locking element is additionally provided. The locking element is designed to hold the unlocking element in the unlocking position. If the locking element does not hold the unlocking element in the unlocking position, the free state of the locking mechanism cannot be (passively) maintained by the unlocking element. This means that the unlocking position of the deviating (and thus, in the case of a parking lock in normally locked configuration, the free) state of the locking mechanism can only be adjusted (permanently) in cooperation with the unlocking element and the locking element.

According to a further aspect, a parking lock device is proposed, having a locking gear arranged in a lockable torque flow and a parking lock according to an embodiment according to the above description, wherein the locking gear can be blocked by means of the locking mechanism.

The parking lock device proposed here comprises a parking lock and a locking gear. The locking gear is integrated in a lockable torque flow of a drive train of a motor vehicle, such as in a transmission, and can be blocked in accordance with the previous description.

In an example embodiment, the parking lock and the locking gear form a structural unit. Such a structural unit can be delivered for installation as an integral component and can be mounted at the intended assembly location, for example in a motor vehicle, without the need to disassemble said structural unit again. In an example embodiment the locking mechanism, and in an example embodiment also the locking gear, is one assembly while the operating actuator is formed separately, wherein in an example embodiment the operating actuator forms a separate further assembly. When installed in a drive train of a motor vehicle, for example, the locking gear is arranged in such a way that at least one of the consumers is prevented from transmitting or absorbing torque when the locking mechanism is in the locking state, i.e., the locking gear is blocked.

According to a further aspect, a transmission for a drive train is proposed, having at least the following components:

a parking lock device according to an embodiment as described above;

a torque transmission gear, which comprises the locking gear; and a transmission housing, which surrounds a transmission chamber, and the locking mechanism of the parking lock, or the entire parking lock device, is arranged in the transmission chamber.

The transmission, for example an automatic transmission for a drive train of a motor vehicle, comprises the locking gear. For example, the locking gear forms a spur gear of a torque transmission gearing designed as a switchable transmission gearing. The transmission has a torque input, for example one or more transmission input shafts, and a torque output, for example one or more transmission output shafts.

In the transmission, the torque is distributed to be deflected, stepped down, stepped up, and/or taken off (as a differential) .

In an example embodiment, the transmission is a clutch, for example a friction clutch or dog clutch, in the torque flow. The torque input is arranged on the drive engine side and the torque output is arranged on the consumer side. However, the direction of the torque is also possible in reverse, from a consumer (in the case of a recuperation) to a drive machine or a generator. In an example embodiment of the transmission, it is also proposed that the parking lock be integrated in its entirety, or only the locking mechanism, in a transmission chamber of the transmission formed by a transmission housing.

According to a further aspect, a drive train is proposed, having at least the following components:

at least one drive machine for delivering a torque;

at least one consumer for receiving a torque; and a transmission according to an embodiment according to the above description, and the at least one drive machine and the at least one consumer are connected to one another in a torque-transmitting manner by means of the transmission, and a torque transmission between the drive machine and the at least one consumer by means of the parking lock device is prevented in the locking state of the locking mechanism.

The drive train proposed here comprises at least one drive machine, for example an internal combustion engine and/or an electric drive machine, which forms the torque source of a torque flow at least in a main state. Furthermore, at least one consumer is comprised, for example propulsion wheels of a motor vehicle, which forms the torque sink of the torque flow at least in a main state. Interposed is a transmission according to an embodiment according to the preceding description, via which the torque flow (preferably the entire wheel-side) is conducted. When the transmission is locked, the flow of torque is locked and torque transmission in the drive train between the torque source and the torque sink is prevented.

The drive train proposed here comprises a transmission which has such a parking lock device with which both the driving position (free state) and the parking position (locking state) can be maintained passively, i.e., without external energy consumption. In addition, with a very low power consumption (e.g., the coil of the purely optional lifting magnet), the deviating (e.g., free) state of the parking lock can be reversed again, and thus can ensure the maintaining of the normal (e.g., locking) state of the parking lock in almost all cases, even if the electronics fail, for example by means of a local electrical capacitor as emergency storage. The transmission can be designed with the same installation space and with only minor additional costs compared to a parking lock device without the possibility of unlocking. In addition, there is a high reliability that the drive train is only put into operation as long as the parking lock device is unlocked.

According to a further aspect, a motor vehicle is proposed, having at least one propulsion wheel and a drive train according to an embodiment according to the above description. For propulsion of the motor vehicle, a torque can be transmitted from the at least one drive machine of the drive train to the at least one propulsion wheel, and a rolling of the motor vehicle is prevented by means of the parking lock device in the locking state of the locking mechanism.

The motor vehicle is, for example, a passenger car, a truck or a motorized two-wheeler. The motor vehicle has a drive train according to an embodiment according to the preceding description. The torque that can be output by the at least one drive machine is output to the at least one propulsion wheel (consumer) via the transmission. The transmission referred to here can be a shiftable transmission gearing. Alternatively, the vehicle transmission is, for example, a fixed transmission gearing, i.e., with an unchangeable transmission, or a differential or a slip clutch. The parking lock device proposed here is can designed as described above and integrated into the transmission.

A rotational movement of the at least one propulsion wheel is only possible in a parking shift position when the parking lock (and the legally required parking brake) are released. Otherwise, reference is made to the preceding description of the parking lock device.

The drive train proposed here comprises a transmission which has such a parking lock device with which both the driving position (free state) and the parking position (locking state) can be maintained passively, i.e., without external energy consumption. In addition, with a very low power consumption (e.g., the coil of the purely optional lifting magnet), the deviating (e.g., free) state of the parking lock can be reversed again, and thus can ensure the maintaining of the normal (e.g., locking) state of the parking lock in almost all cases, even if the electronics fail, for example by means of a local electrical capacitor as emergency storage. The transmission can be designed with the same installation space and with only minor additional costs compared to a parking lock device without the possibility of unlocking. In addition, there is a high reliability that the drive train is only put into operation as long as the parking lock device is unlocked.

BRIEF DESCRIPTION OF THE DRAWINGS

The disclosure described above is explained in detail below against the pertinent technical background with reference to the accompanying drawings, which show example embodiments. The disclosure is in no way restricted by the purely schematic drawings, wherein it should be noted that the drawings are not dimensionally accurate and are not suitable for defining proportions. In the figures.

DETAILED DESCRIPTION

Figure 1:
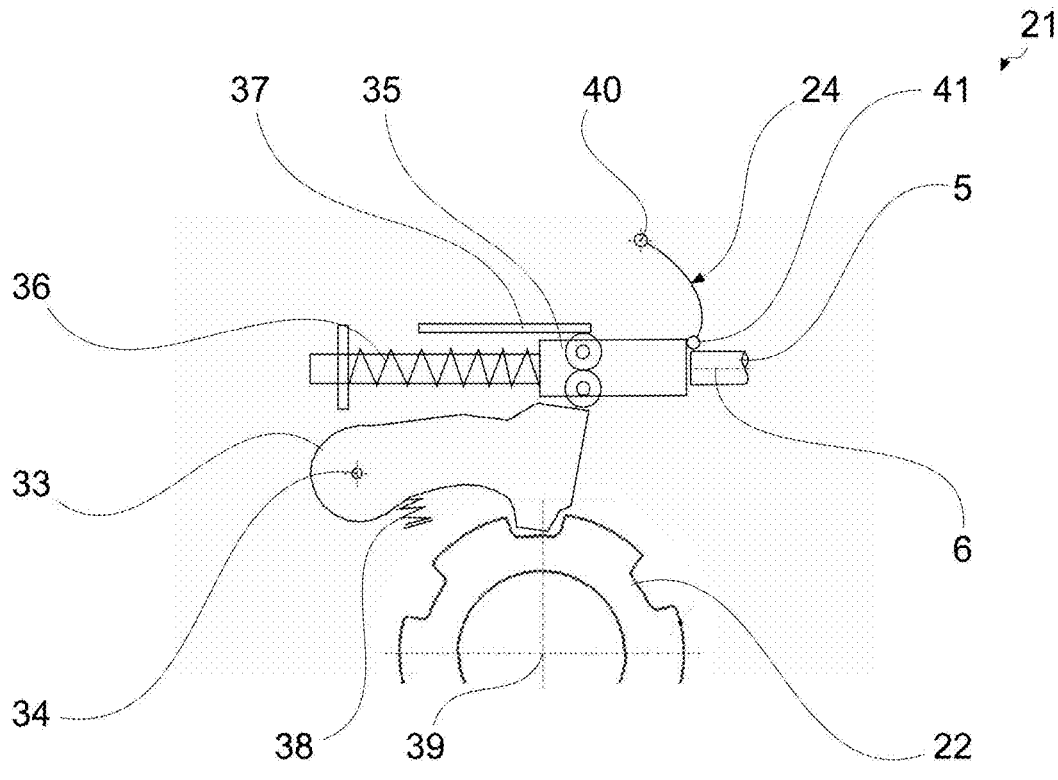
FIG. 1: shows a locking mechanism of a parking lock in the locking state.

FIG. 1 shows a locking mechanism 21 of a parking lock 2 (compare FIG. 7) in a normally locked configuration in a locking state in a schematic side view with a locking gear 22. The locking mechanism 21 comprises a parking lock pawl 33, which is mounted such that it can rotate about its pawl axis 34, and is shown here in the locking state. When the locking mechanism 21 is brought into the locking state, the parking lock pawl 33 is positively engaged with the locking gear 22 so that the locking gear 22 is blocked. Then a traverse 35 is forced by a pretensioned spring 36 (shown here as a compression spring) into such a position that here (purely optional by means of the traverse 35 being supported on a fixed frame 37, for example part of a gear housing 27, compare FIG. 7) the parking pawl 33 is geometrically blocked in the locking state (tooth-in-gap engagement on the locking gear 22). In a free state of the traverse 35, not shown here, the pretensioning spring 36 is tensioned (compressed here to the left as shown). In this embodiment, the parking pawl 33 is lifted out of a tooth gap of the locking gear 22 by means of a release spring 38 (for example a torsion spring or compression spring).

Figure 2:
FIG. 2: shows an actuator having an actuation element in the deflected position.
Figure 2:
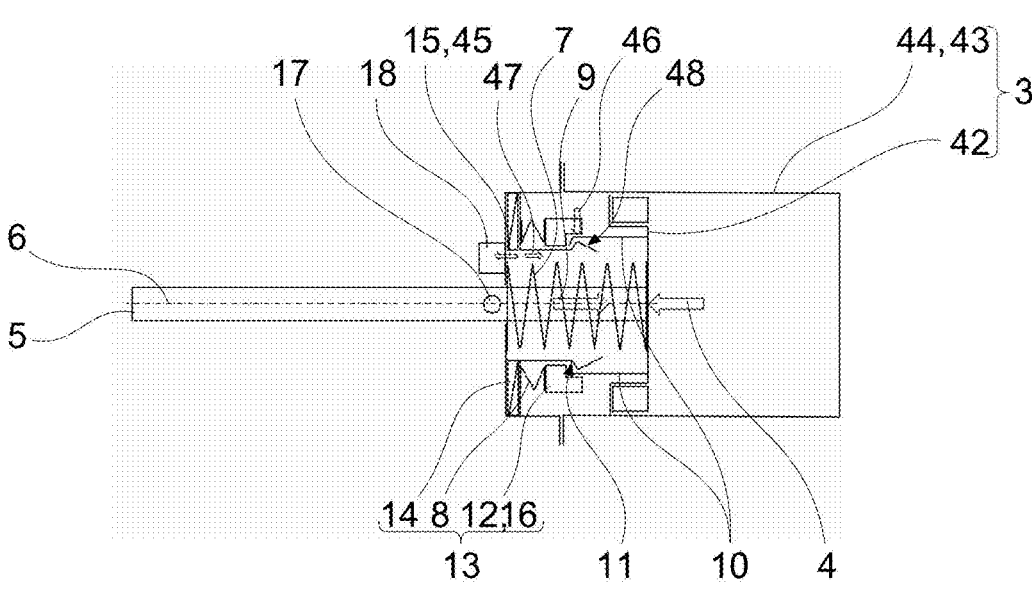
Figure 3:
FIG. 3: shows an actuator according to FIG. 2 with the actuation element in the normal position.
Figure 3:
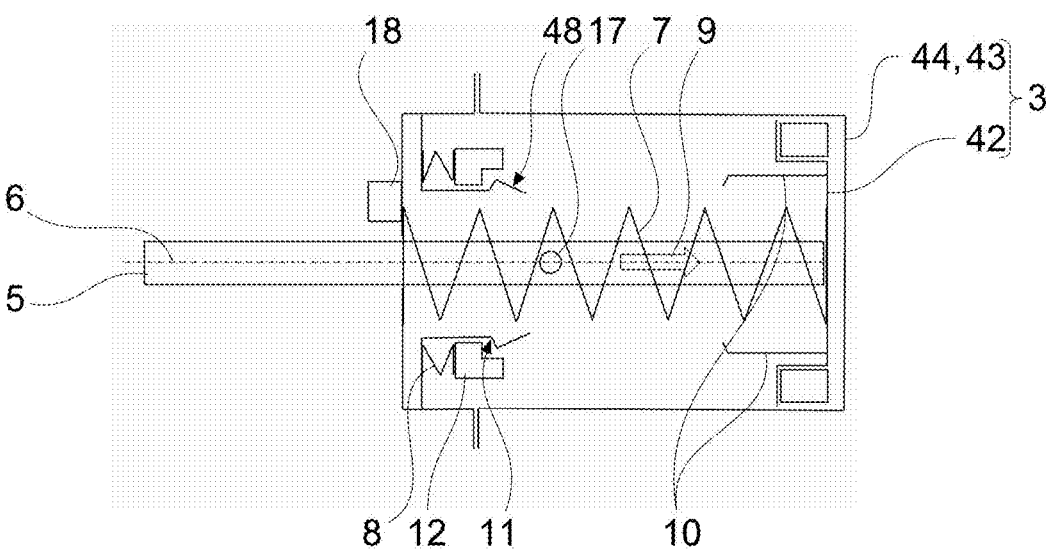

In the normal state, the parking lock pawl 33 can only be transferred from the engaged (locking) state to the free state by actively actuating an actuation element 5 (indicated here on the right in the illustration) of an actuator 1 with an axial force 4 opposite to the pretensioning by means of the pretensioning spring 36 against the traverse 35 (as shown to the left) and the pretensioning spring 36. The actuator 1 is designed, for example, as shown in FIG. 2 and FIG. 3. The parking lock pawl 33 thus remains in the free state as long as the traverse 35 is deflected by the actuation element 5 of the actuator 1 and the locking gear 22 can rotate freely about its wheel axis 39.

In this example embodiment, the parking lock 2 further comprises, purely optionally, an unlocking element 24, which in the embodiment shown is a lever that can be pivoted about a pivot axis 40. Purely optionally, the pivot axis 40 runs perpendicular to the actuation axis 6. The unlocking element 24 shown here acts with its actuating tip 41 (optionally directly) on the traverse 35, so that in this embodiment the parking lock pawl 33 can be transferred from the engaged (locking) state to the free state by pivoting clockwise about the pivot axis 40. The actuation element 5 can remain in its normal position (parking position).

FIG. 2 shows an actuator 1 having an actuation element 5 in a deflected position in a schematic sectional view. The actuator 1 is set up, for example, to actuate a locking mechanism 21 according to FIG. 1. The actuation element 5 can be actively moved along an actuation axis 6 by means of an axial drive means 3, so that the actuation element 5 can be moved from right to left according to the illustration. The axial drive means 3 is designed here as a fluid (such as hydraulic) slave unit. Controlled by a fluid, a slave piston 42 in a slave cylinder 43 (counter bearing 44) is pushed from a normal (here first) position into a deflected (here second) position. The resulting axial force 4 thus forces the actuation element 5 to the left, as shown. In this case, no tensile force can be transmitted to the actuation element 5 by the slave unit. Rather, the actuation element 5 is pretensioned to the right as shown in the drawing by means of a first energy storage element 7 (here a helical compression spring arranged to be coaxial to the actuation axis 6). A stored force 9 that is antagonistic to the axial force 4 is therefore exerted by the first energy storage element 7 on the slave piston 42 and thus on the actuation element 5. Without external energy consumption (here in the form of a fluidic pressure), the normal position (see FIG. 3) is assumed by the actuation element 5 (passively).

A stopper element 10 is provided here, which is firmly connected to the axial drive means 3. The stopper element 10 is designed here as a latching element, more precisely as (a plurality of) spring lugs, having a contact point. The corresponding stopper component 11 is firmly connected to the counter bearing 44 of the axial drive means 3. The stopper component 11 is designed here as a complementary latching receptacle, wherein the contact point of the stopper element

10 can be held in place by means of a corresponding undercut. When a sufficient axial force 4 of the axial drive means 3 is applied, the stopper element 10 therefore slides into the stopper component 11, which is designed here as an undercut (form fit), such as in the manner of a snap closure. In this case, the stopping force 45 is so small that it alone cannot be used to protect against the stored force 9 of the first energy storage element 7. Rather, the stored force 9 is so great that the connection between the stopper element 10 and the stopper component 11 can thus be released, so that the actuation element 5 is passively transferred to the normal position. If sufficient axial force 4 is not generated, the stopper element 10 slides out of the stopper component 11 and the operating element 5 assumes the normal position.

Because in a motor vehicle 32 the deflected position (with the locking mechanism 21 according to FIG. 1 driving position) is a permanent state during operation, little or no external energy consumption is desired here. A holding element 12 is provided here for this purpose. The stopper element 10 is (at least additionally) secured by means of the holding element 12 against sliding out during the deflected position, here by means of a form fit (snap closure). The holding force 46 of the holding element 12 is sufficient to fix the connection between the stopper element 10 and the stopper component 11 against the stored force 9 of the first energy storage element 7.

In this embodiment, the holding element 12 itself is pretensioned by a second energy storage element 8 into the locking position shown by means of a pre-holding force 47 and thus secures the contact point of the spring lug (stopper element 10) in the latching groove (stopper component 11). When the coil 14 is energized, such a magnetic field is generated that a magnetic force 15 pointing in the direction of the axial force 4 is applied to the reciprocating piston 16 and thus to the holding element 12 formed in one piece therewith. The pre-holding force 47 is overcome and the stopper element 10 detaches from the stopper component 11 when a sufficiently small (e.g., negligible) axial force 4 is applied. As a result of the stored force 9 of the first energy storage element 7, the actuation element 5 is returned to the normal position.

Furthermore, in the embodiment shown (purely optional) a magnetic field sensor 18 and a position magnet 17 (permanent magnet) are provided, wherein the magnetic field sensor 18 is fixed relative to the counter bearing 44 of the axial drive means 3 and the position magnet 17 is integrated into the actuation element 5. The position of the actuation element 5 can thus be recorded or determined electronically.

FIG. 3 shows an actuator 1 according to FIG. 2 with the actuation element 5 in the normal position. The slave piston 42 is returned to the normal position by means of the stored force 9 of the first energy storage element 7. The (purely optional) embodiment of the stopper element 10 as a plurality of spring lugs which are arranged to be coaxial to the actuation axis 6 and are firmly connected here to the slave piston 42 can be clearly seen here. Furthermore, the (purely optional) embodiment of the holding element 12 as an encircling ring can be understood. It should be pointed out that the holding element 12 is again in the locking position, i.e., the coil 14 is not energized or is energized to a sufficiently low degree that the pre-holding force 47 transfers the holding element 12 into the locking position. The axial force 4 is able to overcome the pre-holding force 47 and thus to latch the stopper element 10 to the stopper component 11, whereupon the holding element 12 returns to the locking position. The whole process can be carried out without actuating the coil 14.

Figure 4:
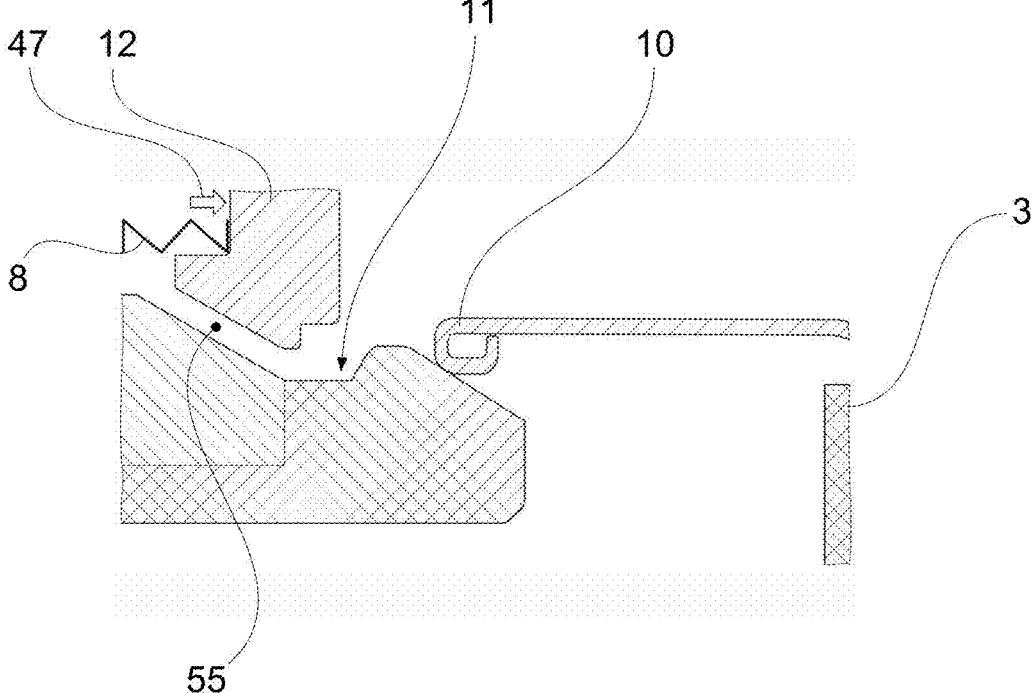
FIG. 4: shows a holding element having a stopper element.

FIG. 4 shows a schematic sectional view of a holding element 12 having a stopper component 11, which is designed as a latching receptacle, and a stopper element 10, which is designed as a snap-in element, more precisely as a snap hook. The latching receptacle (stopper component 11) is designed in such a way that a corresponding snap-in element (stopper element 10) can be accommodated. The holding element 12 is set up to fix the stopper element 10 in the stopper component 11 and is pretensioned to the right by the pre-holding force 47 of the second energy storage element 8 according to the illustration, and can be moved to the left by the magnetic force 15 of the lifting magnet 13 according to the illustration (compare FIG. 2 and FIG. 3).

Figure 5:
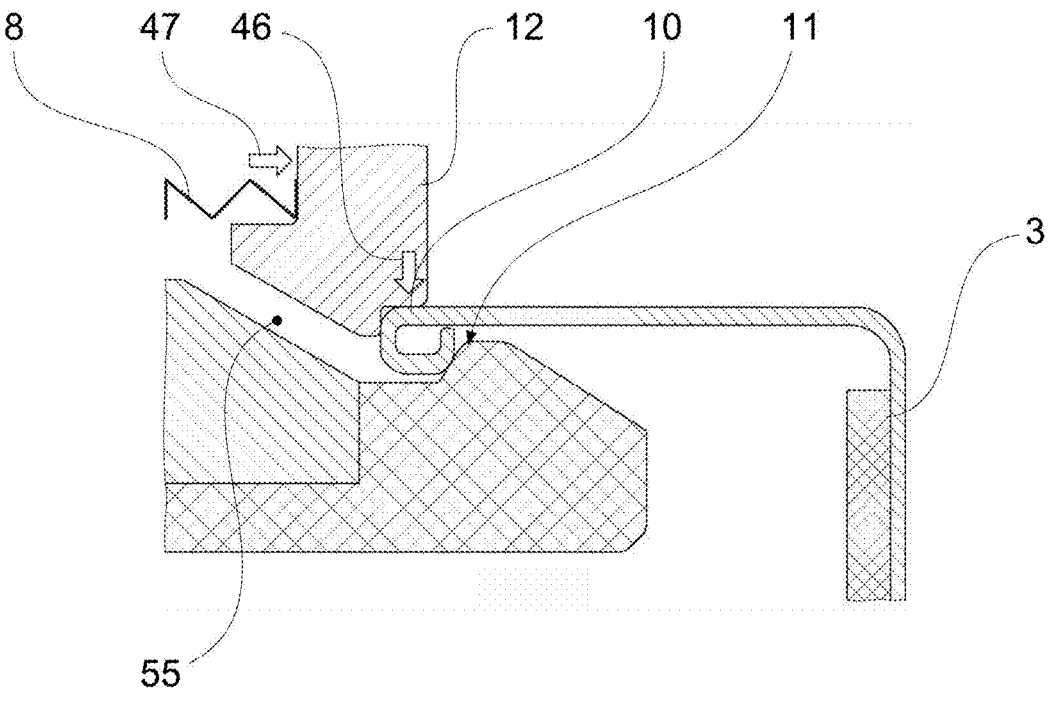
FIG. 5: shows the holding element according to FIG. 4 in a locked position.

In FIG. 5 the holding element 12 according to FIG. 4 is shown in the locking position. The holding force 46 of the holding element 12 results from the contact guiding the holding element 12 when the holding element 12 is held in the shown relative (locking) position by means of the pre-holding force 47 while the stopper element 10 is accommodated in the stopper component 11. In this way, the actuation element 5 is fixed axially in the deflected position, without external energy consumption being necessary.

Figure 6:
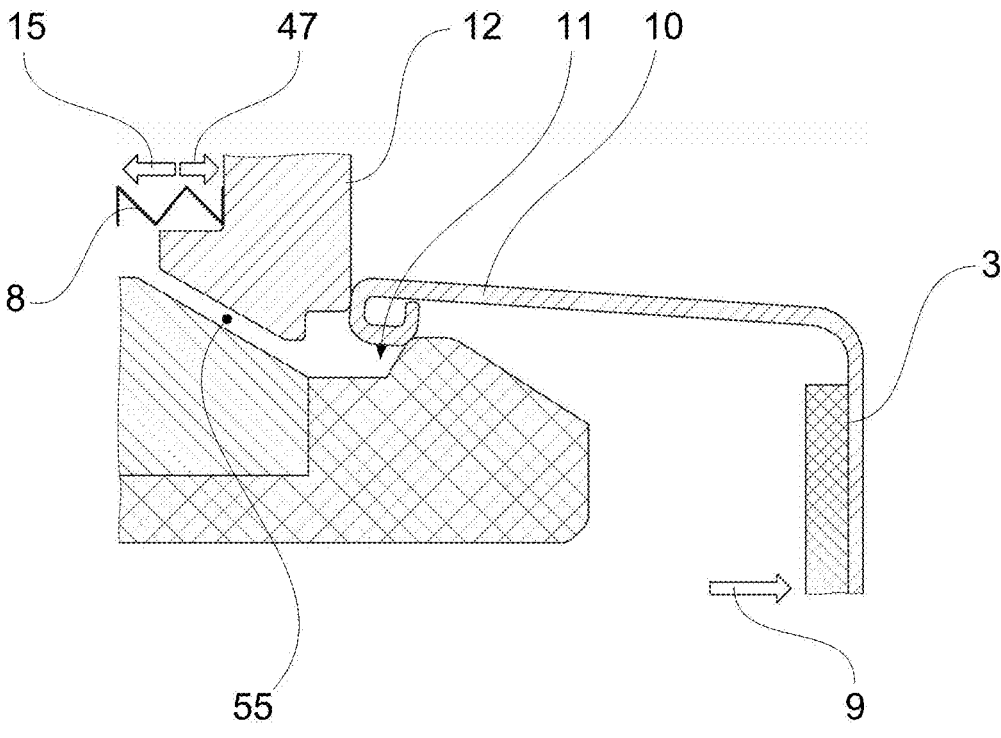
FIG. 6: shows the holding element according to FIG. 4 and FIG. 5 in a releasing position.

In FIG. 6, the holding element 12 according to FIG. 4 and FIG. 5 is shown in a releasing position. The holding force 46 of the holding element 12 is reversed in that the pre-holding force 47 of the second energy storage element 8 is overcome by the magnetic force 15. If there is no (or too little) axial force 4, the actuation element 5 is now brought out of the deflected position again, because the stored force 9 of the first energy storage element 7 causes a radial deflection of the stopper element 10 and the stopper element 10 is released from the stopper component 11.

Figure 7:
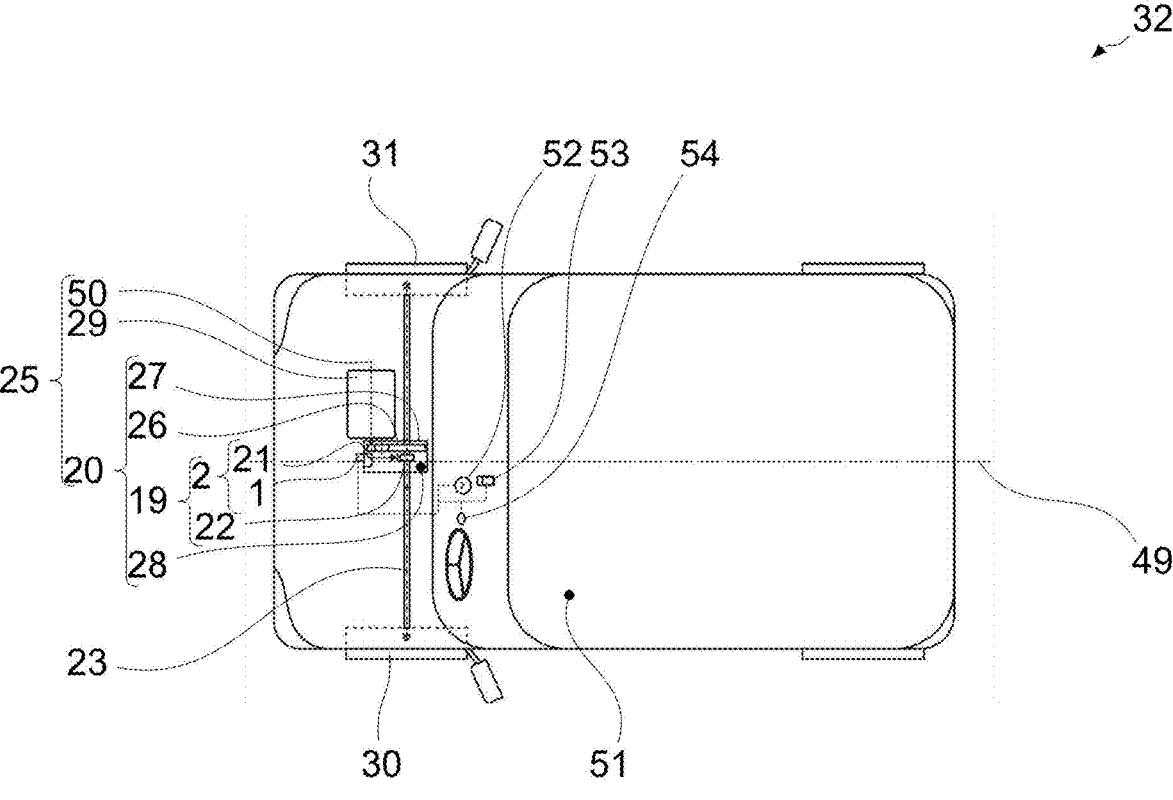
FIG. 7: shows a drive train having a parking lock device in a motor vehicle.

FIG. 7 shows a purely schematic plan view of a motor vehicle 32 having a drive train 25, and a drive machine 29, shown here optionally as an electric drive machine 29, is arranged to be perpendicular to a longitudinal axis 49 along a motor axis 50. The motor axis 50 is arranged in front of a driver's cab 51 of the motor vehicle 32 in the direction of travel. The drive train 25 is set up to propel the motor vehicle 32 by driving a left-hand propulsion wheel 30 and a right-hand propulsion wheel 31 (here optionally the front axle of the motor vehicle 32) by means of a torque output from the engine 29 via a transmission 20, and thus a torque flow 23 shown in dashed lines (shown here with the direction corresponding to a tensile moment). For example, a torque transmission gear 26 is part of a gear 20 which can be shifted by a vehicle driver by means of a gear shift lever 52 in the driver's cab 51.

A parking lock device 19 is now arranged in the torque flow 23, with which the left-hand propulsion wheel 30 and the right-hand propulsion wheel 31 can be blocked. The parking lock device 19 comprises a locking gear 22, for example a gear wheel of the torque transmission gear 26 of the transmission 20 or an additional wheel of the torque transmission gear 26, and a parking lock 2, wherein the parking lock 2 comprises a locking mechanism 21 and an operating actuator 1. The locking mechanism 21 is embodied, for example, as described in FIG. 1. An embodiment of the parking lock device 19 is shown here, in which (optionally) the locking mechanism 21 is arranged within the transmission chamber 28 in a gear housing 27 of the gear 20 and the actuator 1 is arranged outside of the gear housing 27.

The locking gear 22 is arranged in the torque flow 23 in such a way that it can prevent the motor vehicle 32 from rolling away. The parking lock device 19 can be actuated here with at least one of the following operating elements:

by a gear shift lever 52, for example by means of a parking shift position "P";
a parking lever 53; and/or
an ignition button 54 (alternatively an ignition key).

Furthermore, the parking lock device 19 can be actuated automatically, for example when the motor vehicle 32 is exited (for example after it has been locked), the parking lock 2 is automatically engaged.

With the actuator proposed here, the driving position can be maintained without current with little design effort and little installation space requirement.

| LIST OF REFERENCE SYMBOLS | |
|---|---|
| 1 | Actuator |
| 2 | Parking lock |
| 3 | Axial drive means |
| 4 | Axial force |
| 5 | Actuation element |
| 6 | Actuation axis |
| 7 | First energy storage element (ram) |
| 8 | Second energy storage element (holding element) |
| 9 | Stored force |
| 10 | Stopper element |
| 11 | Stopper component |
| 12 | Holding element |
| 13 | Lifting magnet |
| 14 | Coil |
| 15 | Magnetic force |
| 16 | Reciprocating piston |
| 17 | Position magnet |
| 18 | Magnetic field sensor |
| 19 | Parking lock device |
| 20 | Transmission |
| 21 | Locking mechanism |
| 22 | Locking gear |
| 23 | Torque flow |
| 24 | Unlocking element |
| 25 | Drive train |
| 26 | Torque transmission gear |
| 27 | Transmission housing |
| 28 | Transmission chamber |
| 29 | Drive engine |
| 30 | Left propulsion wheel |
| 31 | Right propulsion wheel |
| 32 | Motor vehicle |
| 33 | Parking lock pawl |
| 34 | Pawl axis |
| 35 | Traverse |
| 36 | Pretensioning spring |
| 37 | Frame |
| 38 | Release spring |
| 39 | Wheel axle |
| 40 | Pivot axis |
| 41 | Actuation tip |
| 42 | Slave piston |
| 43 | Slave cylinder |
| 44 | Counter bearing |
| 45 | Stopping force |
| 46 | Holding power |
| 47 | Pre-holding force |
| 48 | Ramp |
| 49 | Longitudinal axis |
| 50 | Motor axis |
| 51 | Driver's cab |
| 52 | Transmission shift lever |
| 53 | Parking lever |
| 54 | Ignition button |
| 55 | Axial gap |

The invention claimed is:
1. An actuator for a parking lock, comprising:
an axial drive means for transmitting an axial force;
an actuation element having an actuation axis configured to be moved axially from a first normal position to a second deflected position via the axial force of the axial drive means;

a first energy storage element for transmitting a stored force configured to be antagonistic to the axial force, the actuation element forced in a direction of the first normal position via the stored force, a stopper element;

a stopper component corresponding to the stopper element;

a holding element configured to be moved between a released position and a locking position, and the stopper element and the stopper component are fixed to one another when the actuation element is in the second deflected position while the holding element is in the locking position, and the actuation element is held in the second deflected position against the stored force of the first energy storage element via the stopper element fixed in the locking position via the holding element; and a second energy storage element configured to hold the holding element passively in the locking position.

2. The actuator according to claim 1, wherein:

the stopper element: i) is firmly connected to the actuation element, and ii) comprises at least one spring element, and the at least one spring element is deflectable exclusively in a radial direction, and a snap closure is formed by the stopper component together with the stopper element.

3. The actuator according to claim 1, further comprising a lifting magnet having:

a coil; and a reciprocating piston configured to be moved axially via a magnetic force generated by the coil, and wherein the holding element is fixedly connected to the reciprocating piston.

4. The actuator according to claim 3, wherein the axial drive means is arranged within a housing, the housing comprising a front housing surface with a passage for the actuation element, and the actuation element is axially displaceable along the actuation axis, and the lifting magnet, the second energy storage element, and the holding element are arranged axially between the front housing surface and the axial drive means.

5. The actuator according to claim 4, wherein the lifting magnet, the second energy storage element, and the holding element are arranged in a ring coaxial to the actuation axis.

6. The actuator according to claim 1, wherein the actuation element is fixed in the second deflected position independently of the axial drive means.

7. A parking lock for a parking lock device of a transmission, the parking lock comprising:

a locking mechanism configured for locking a locking gear in a torque flow, the locking mechanism configured to block the locking gear in a locking state and release the locking gear in a free state; and the actuator according to claim 1, and wherein:

in the second deflected position of the actuation element, the locking mechanism is moved out of the locking state, and the first normal position of the actuation element corresponds to the locking state of the locking mechanism.

8. The parking lock according to claim 7, further comprising an unlocking element configured to be movable between a normal position and an unlocking position, and the free state of the locking mechanism is maintained in the unlocking position of the unlocking element, and in the normal position of the unlocking element, a normally locked function of the parking lock is ensured.

9. A parking lock device for a motor vehicle, comprising:

the locking gear arranged in a lockable torque flow; and the parking lock according to claim 7, and wherein the locking gear is configured to be blocked via the locking mechanism.

10. A transmission for a drive train of a motor vehicle, comprising:

the parking lock device according to claim 9;

a torque transmission gear comprising the locking gear; and a transmission housing configured to surround a transmission chamber, and wherein the locking mechanism of the parking lock is arranged within the transmission chamber.

11. A drive train for a motor vehicle, comprising:

at least one drive machine configured for delivering a torque;

at least one consumer for receiving the torque; and the transmission according to claim 10, and wherein the at least one drive machine and the at least one consumer are connected to one another in a torque-transmitting manner via the transmission, and the torque transmitted between the at least one drive machine and the at least one consumer is prevented via the parking lock device when the locking mechanism is in the locking state.

12. The transmission according to claim 10, wherein the entire parking lock device is arranged in the transmission chamber.

13. An actuator for a parking lock, comprising:

an actuation element having an actuation axis configured to be moved axially from a first normal position to a second deflected position via an axial force;

a first energy storage element for transmitting a stored force configured to be antagonistic to the axial force, the actuation element forced in a direction of the first normal position via the stored force, a stopper element;

a stopper component corresponding to the stopper element;

a holding element configured to be moved between a released position and a locking position, and the stopper element and the stopper component are fixed to one another when the actuation element is in the second deflected position while the holding element is in the locking position, and the actuation element is held in the second deflected position against the stored force of the first energy storage element via the stopper element fixed in the locking position via the holding element; and a second energy storage element configured to hold the holding element passively in the locking position.

14. The actuator according to claim 13, wherein:

the stopper element: i) is firmly connected to the actuation element, and ii) comprises at least one spring element, and the at least one spring element is deflectable exclusively in a radial direction, and a snap closure is formed by the stopper component together with the stopper element.

15. The actuator according to claim 13, wherein the stopper element includes a plurality of spring elements configured to slidingly engage the stopper component.

16. The actuator according to claim 13, further comprising a reciprocating piston configured to be moved axially via a magnetic force, and the holding element is fixedly connected to the reciprocating piston.

17. The actuator according to claim 13, wherein the second energy storage element is a spring having a spring axis parallel with the actuation axis.

18. The actuator according to claim 13, further comprising a lifting magnet having:

a coil; and a reciprocating piston configured to be moved axially via a magnetic force generated by the coil, and wherein the holding element is fixedly connected to the reciprocating piston.

19. The actuator according to claim 18, wherein the actuation element is fixed in the second deflected position independently of the axial force.

20. The actuator according to claim 18, wherein the holding element and the reciprocating piston are integrally formed in one piece.

* * * * *